A. FESLER.
LUBRICATING APPARATUS.
APPLICATION FILED MAY 5, 1919.

1,342,671. Patented June 8, 1920.

Witnesses: Inventor
Andrew Wintercorn Andrew Fesler
By William Bradley &c.
attys.

UNITED STATES PATENT OFFICE.

ANDREW FESLER, OF DETROIT, MICHIGAN, ASSIGNOR, BY MESNE ASSIGNMENTS, TO THE BASSICK MANUFACTURING COMPANY, A CORPORATION OF DELAWARE.

LUBRICATING APPARATUS.

1,342,671.                    Specification of Letters Patent.      Patented June 8, 1920.

Application filed May 5, 1919. Serial No. 294,848.

*To all whom it may concern:*

Be it known that I, ANDREW FESLER, a citizen of the United States, residing at Detroit, in the county of Wayne and State of Michigan, have invented a certain new and useful Improvement in Lubricating Apparatus, of which the following is a full, clear, concise, and exact description, reference being had to the accompanying drawings, forming a part of this specification.

My invention relates to improvements in lubricating apparatus, and is especially concerned with that type of lubricating apparatus in which the bearing to be lubricated is provided with a coupling member which is adapted to be so connected with a co-acting coupling member on the end of the discharge conduit of a grease gun that lubricant may be forced into the bearing under high pressure. Such apparatus is disclosed in the co-pending applications of Arthur V. Gullborg, Serial Nos. 216,586 and 267,858, filed February 11, 1918, and February 21, 1918, respectively.

The objects of my invention are:

First: to provide the discharge conduit of the grease gun with a novel swivel coupling member;

Second: to provide improved means for sealing the connection between the coupling member secured to the bearing and the coupling member secured to the discharge conduit of the grease gun; and Third: to provide means of the character described, which is of simple but rugged construction, and economical to manufacture.

Other objects will appear as this description progresses, reference being had to the accompanying drawings, in which—

Throughout the several views similar reference characters will be used to refer to similar parts.

Figure 3:
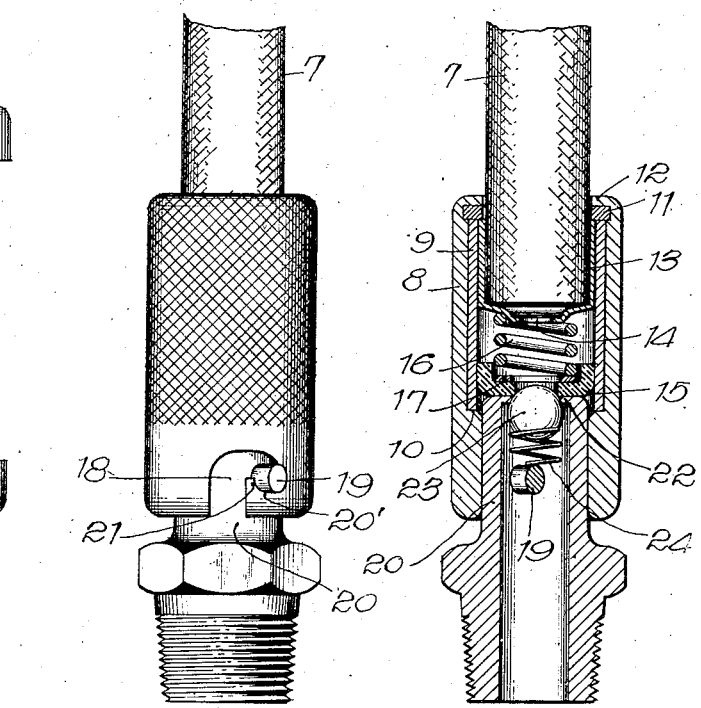
Fig. 3 is a central longitudinal section through the structure shown in Fig. 2.

The reference character 5 indicates the barrel of a grease gun which is provided with a plunger (not shown) actuated by a screwthreaded plunger rod 6, the pitch of the threads of which is such as to enable the operator to subject the lubricant in the grease gun to exceedingly high pressure. The grease gun is provided with a flexible discharge conduit 7, which terminates in a swivel coupling, which forms a part of my invention. The details of this coupling are clearly illustrated in Fig. 3, in which the reference character 8 indicates an outer sleeve, in which is rotatably mounted the inner sleeve 9. The bore of the outer sleeve is contracted adjacent its lower end, to provide a shoulder 10, upon which the lower end of the sleeve 9 rests, and which prevents the sleeve 9 from being displaced downwardly relatively to the sleeve 8. The sleeve 9 is held against longitudinal displacement from the sleeve in the opposite direction, by means of a ring 11, over which the upper end of the sleeve 8 is swaged, as shown at 12. A cup 13 is soldered or otherwise secured to the free end of the discharge conduit 7, which is then inserted into the sleeve 9, and then soldered or otherwise secured to the inner wall of the sleeve 9. The bottom of the cup 13 is perforated as shown at 14, to permit the passage of lubricant therethrough. My chief purpose in providing the cup 13 is to enable me to make use of tubing of standard size for making the inner sleeve 9. I find that I am unable to procure tubing having an internal diameter equal to the external diameter of the discharge conduit 7. The caps 13 can be quickly and economically manufactured by punching them from sheet metal. Where it is possible to obtain flexible conduits having an outer diameter equal to the internal diameter of the sleeves 9, the cap 13 may be omitted and the conduit 7 soldered directly to the inner wall of the sleeve 9.

The reference character 15 indicates a cup leather which is slidably mounted in the inner sleeve 9, and is yieldingly held in spaced relation to the end of the discharge conduit by means of a compression spring 16, the end of which bears against a washer 17 in the cup leather. The lower end of the outer sleeve 8 is provided with a pair of bayonet slots 18, which are oppositely disposed to each other, and only one of which is illustrated in the drawings. These slots are adapted to receive the ends of the pin 19, which extends through both walls of the tubular coupling member 20 and projects from the walls thereof. It will be noted that the lower side of the bayonet slot is recessed as shown at 20', to provide a stop 21, which resists rotation of the two coupling members relative to each other. The upper end of the tubular coupling member 20 is flanged over, as shown at 22, to provide a seat for the ball closure 23. The closure 23 is held in its closed position by means of a compression spring 24, which is interposed between the closure 23 and the pin 19.

I do not claim as my invention the details of the tubular member 20 described above, nor the means which I have described for connecting the two coupling members, as these means are described in the copending applications of Arthur V. Gullborg above referred to.

Figure 1:
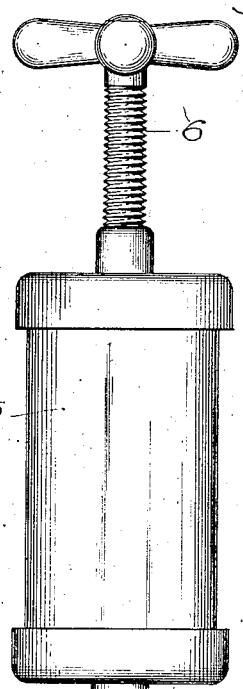
Figure 1 is a side elevation of a grease gun having a flexible discharge conduit provided with a coupling member constructed in accordance with my invention, and which is illustrated as being connected with a coupling member adapted to be secured to a bearing, a portion of the flexible discharge conduit being broken away.
Figure 2:
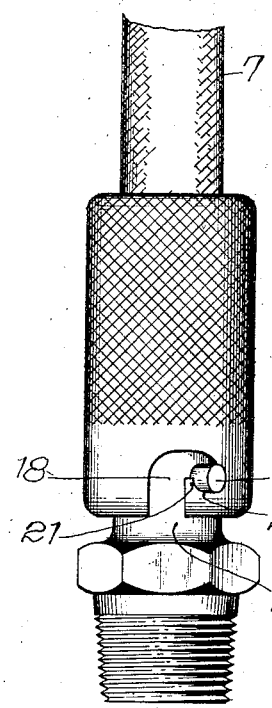
Fig. 2 is a view on an enlarged scale, illustrating the means for connecting a coupling member on a discharge conduit, with the coupling member which is to be secured to a bearing.

To connect the swivel coupling member of the grease gun with the tubular coupling member 20, the sleeve 8 is brought into register with the upper end of the coupling member 20, and then moved downwardly. The lower side of the cup leather 15 is thus brought into contact with the upper end of the coupling member 20, and further movement of the two members relative to each other places the spring 16 under tension. When the sleeve 8 has been pushed far enough over the upper end of the coupling member 20, it is rotated about its axis to bring the recess 20' beneath the pin 19. Pressure upon the sleeve 8 is then released, and the tension of the spring serves to move the sleeve 8 upwardly, and thus position the pin 19 in the recess 20', as shown in Fig. 2. This movement of the two coupling members is not, however, sufficient to completely relieve the tension of the spring 16, and the cup leather is consequently yieldingly held against the top of the coupling member 20, so that when the grease gun is actuated to subject the lubricant therein to pressure, there will be no opportunity for the lubricant to escape between the contacting surfaces of the cup leather and the upper end of the tubular coupling member 20. As the pressure is increased, the pressure of the lubricant itself tends to hold the cup leather more firmly upon the upper end of the tubular member, and thus still more tightly seal the connection between the swivel coupling member and the coupling member attached to the bearing.

It will be noted that the cup leather or gasket 15 serves two functions, first, to seal the connection between the swivel coupling member 20; and second, to seal the joint between the inner and outer sleeves. It will thus be clear that I have provided a device which is simple and rugged in construction, and which embodies means for effectively preventing the escape of lubricant from the swivel coupling member or between this member and the coupling member secured to the bearing.

In describing my improved invention I have referred to the upper and lower ends of certain portions thereof. It is to be clearly understood that these terms are merely relative and not absolute, as my device is capable of being used in many different positions.

While I have described the details of the preferred embodiment of my invention, it is to be clearly understood that it is capable of other adaptations and modifications within the scope of the appended claims.

Having thus described my invention, what I claim is:

1. A coupling comprising a sleeve having a bore contracted to provide a shoulder, a second sleeve rotatably mounted in said first-named sleeve, and having one end resting against said shoulder, means engaging the other end of said second sleeve, for preventing it from being withdrawn from said first-named sleeve, a conduit having one end secured in the last-named end of said second sleeve, a gasket slidably mounted in said second sleeve, and a spring interposed between said gasket and said conduit, the end of said first-named sleeve opposite said conduit being provided with means for detachably connecting said sleeve to a second conduit.

2. A coupling comprising a sleeve having a bore contracted to provide a shoulder, a second sleeve rotatably mounted in said first-named sleeve, and having one end resting against said shoulder, means engaging the other end of said second sleeve, for preventing it from being withdrawn from said first-named sleeve, a conduit having one end secured in the last-named end of said second sleeve, a gasket slidably mounted in said second sleeve, and a spring interposed between said gasket and said conduit.

3. A coupling comprising an outer sleeve, an inner sleeve rotatably mounted in said outer sleeve, means for preventing said inner sleeve from being longitudinally displaced from said outer sleeve, a conduit having one end secured in one end of said inner sleeve, a gasket movably mounted in the other end of said inner sleeve, and means interposed between said conduit and said gasket for yieldingly holding said gasket in spaced relation to the end of said conduit.

4. A coupling comprising an outer sleeve, an inner sleeve rotatably mounted in said outer sleeve, means for preventing said inner sleeve from being longitudinally displaced from said outer sleeve, a conduit having one end secured to one end of said inner sleeve, and a gasket movably mounted in the other end of said inner sleeve.

5. The combination with a coupling member having a tubular portion, of a second coupling member comprising an outer sleeve, one end of which is adapted to receive the tubular portion of said first-named coupling member, an inner sleeve rotatably mounted in said outer sleeve, and a gasket in said inner sleeve for sealing the joint between said sleeves, and for contacting with the end of said first-named coupling member, and thereby sealing the connection between said coupling members.

6. The combination with a coupling having a tubular portion, of a second coupling comprising a sleeve having one end for receiving the tubular portion of said first-named coupling member, a conduit having one end rotatably secured to the other end of said sleeve, and a single gasket for sealing the joint between said conduit and said sleeve, and the joint between said first-named coupling and said sleeve.

In witness whereof, I hereunto subscribe my name this 19th day of April, 1919.

ANDREW FESLER.

Witnesses:
ALLAN H. FRAZER,
MARTHA E. SPENCER.